United States Patent
Leman et al.

(10) Patent No.: US 10,536,103 B2
(45) Date of Patent: Jan. 14, 2020

(54) CURRENT SENSING BASED COMMUTATION CONTROL

(71) Applicant: Melexis Bulgaria Ltd., Sofia (BG)

(72) Inventors: Dirk Leman, Lier (BE); Xing Zuo, ShenZhen (CN)

(73) Assignee: MELEXIS BULGARIA LTD., Sofia (BG)

( * ) Notice: Subject to any disclaimer, the term of this patent is extended or adjusted under 35 U.S.C. 154(b) by 0 days.

(21) Appl. No.: 16/025,006

(22) Filed: Jul. 2, 2018

(65) Prior Publication Data

US 2019/0013757 A1    Jan. 10, 2019

(30) Foreign Application Priority Data

Jul. 4, 2017 (EP) .................................... 17179611

(51) Int. Cl.
| | |
|---|---|
| H02P 23/14 | (2006.01) |
| H02P 6/20 | (2016.01) |
| H02P 6/08 | (2016.01) |
| H02P 25/03 | (2016.01) |

(52) U.S. Cl.
CPC ............... H02P 23/14 (2013.01); H02P 6/08 (2013.01); H02P 6/20 (2013.01); H02P 25/03 (2016.02)

(58) Field of Classification Search
CPC .. H02P 23/14; H02P 25/03; H02P 6/08; H02P 6/20
See application file for complete search history.

(56) References Cited

U.S. PATENT DOCUMENTS

| | | | |
|---|---|---|---|
| 2003/0062860 A1 | 4/2003 | Wu et al. | |
| 2006/0214611 A1 | 9/2006 | Wang et al. | |
| 2010/0251511 A1* | 10/2010 | Clothier | A47L 5/24 |
| | | | 15/412 |
| 2016/0118916 A1* | 4/2016 | Gohara | H02P 6/085 |
| | | | 318/400.13 |

FOREIGN PATENT DOCUMENTS

EP    17179574.3    7/2017

OTHER PUBLICATIONS

Extended European Search Report from EP Application No. EP 17179611.3, dated Jan. 4, 2018.
European Office Action from EP 17179611.3, dated Oct. 4, 2019.

* cited by examiner

*Primary Examiner* — Kawing Chan
*Assistant Examiner* — Bradley R Brown
(74) *Attorney, Agent, or Firm* — Workman Nydegger

(57) ABSTRACT

A method for controlling a single coil brushless DC motor, the method comprising at least a first EHP sequence which comprises: driving the motor using a driving signal during a torque generating period, to accelerate the motor, such that during a subsequent generator mode period a phase current goes in generator mode; driving the motor during the generator mode period using a generator mode signal, which allows the phase current to be in generator mode; monitoring the phase current during the generator mode period thereby obtaining phase current information; and determining parameters of a next EHP sequence based on the obtained phase current information.

12 Claims, 7 Drawing Sheets

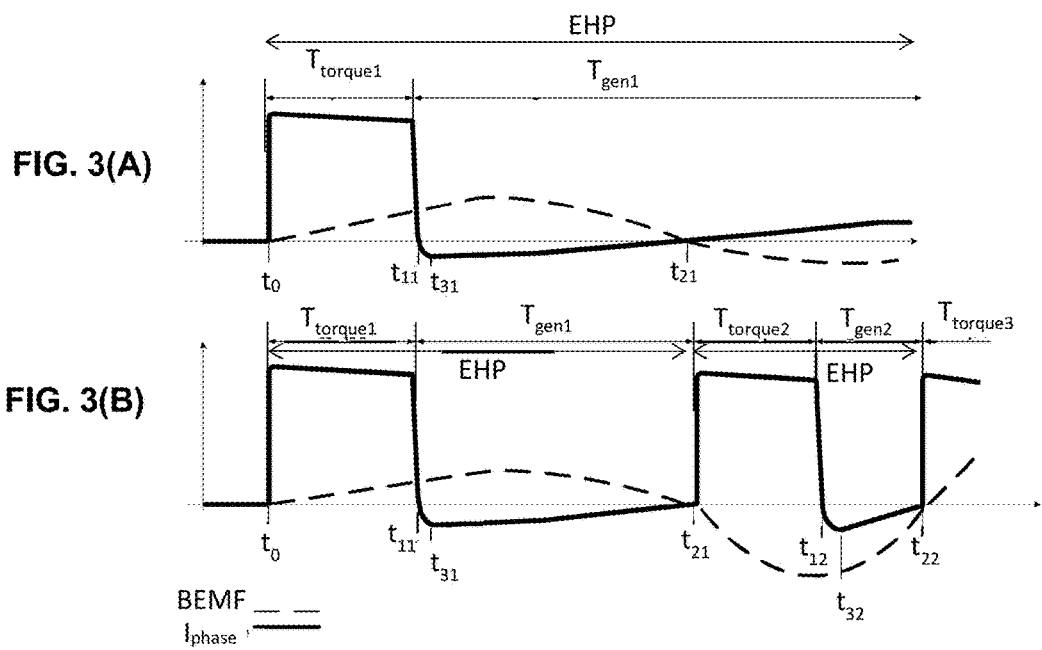

CURRENT SENSING BASED COMMUTATION CONTROL

FIELD OF THE INVENTION

The present invention relates to methods and systems for controlling a single coil brushless DC motor. More specifically it relates to sensorless control of brushless DC motors.

BACKGROUND OF THE INVENTION

Brushless DC motors typically comprise a magnetic rotor and one or more stator coils. For driving the rotor by applying a suitable driving current waveform to one or more stator coils it is important to know the rotor position in relation to the stator coils. In function of this position the driver generates a current in a specific direction through a specific coil to generate torque so as to turn the rotor in a desired direction. When the rotor has turned beyond a certain position, (the commutation point), the current direction needs to be inverted (commutated) so that it is again in the appropriate direction to generate torque in the desired direction.

Methods and systems for controlling the commutation of a brushless DC motor may be based on Hall sensors. These Hall sensor(s) detect the position of the rotor in relation to the stator coils and based thereon the current through the motor coils(s) is controlled.

US2016118916 discloses a motor driving apparatus which comprises a Hall sensor for obtaining a position of the rotor and a current monitoring circuit for asserting a zero current detection signal when a reversion of direction of a coil current flowing into the motor coil is detected. Using this configuration, it is possible to detect the amount of phase lead and lag based on the timing of the zero current and to determine an appropriate correction amount based on the detected amount of phase lead and lag. Based on the correction amount the transition sequence of the H bridge circuit is shifted forward or backward in time.

In order to avoid the need for a Hall sensor, sensorless commutation methods are developed. Such sensorless methods may for example monitor the BEMF (back electromotive force) voltage for estimating the position of the rotor. Sensorless methods make the motor construction less complex, because the hall sensor position is critical for the operation of Hall based commutation. In low-cost high volume fan systems such as they are used for CPU cooling, refrigerator ventilation, power converter cooling, etcetera, but also in low cost pumps to displace liquids, single coil fans, based on hall sensing are applied. In case in such low-cost systems the hall sensor could be avoided, it is clear, that the single coil motor controller may no longer have to be applied close to the rotor, or even not inside the motor assembly, for instance a fan or pump, anymore. In current low-cost systems remote controllers typically use PWM input signals, and FG/RD output pins, as communication interface to control the fandrivers which are integrated into the remote fan. In case of sensorless control, a significant system simplification can be achieved by locating the fandriver close to the controller, or even integrate into the remote controller.

Another problem is that the BEMF voltage can only be measured correctly, if there is no current flowing in the coil. For this purpose, a window with no current in the coil must be created in the driving wave form profile. In case of single coil motor control such interruption of the phase current might introduce a torque ripple in the torque generated by the motor, causing audible or EMC noise.

In three phase BLDC motors, a well-known first commutation strategy, referred to as trapezoidal control is to monitor the BEMF voltage zero crossing (BEMF_ZC) in the third coil which is not driven, while delivering the torque by driving the first and second coil.

In more advanced three phase BLDC control strategies, referred to as sinewave strategies, the commutation is defined while all three coils are driven. There exist methods wherein at predefined moments every 60 degree or multiples of 60 degree, the rotor position is defined.

In even more advanced methods, referred to as Field Orient Control (FOC), the current is continuously monitored.

As the methods get more complex, the needed calculation increases drastically. For FOC control 8-bit, 16 bit and even 32 bit CPUs are applied. Also the performance of these methods is strongly depending on the motor magnetic design. In all cases the delivering of constant torque requires a continuous flow of a controlled amount of current. In typical cases the motor magnetic design is not optimal. The control of the amount of current has to compensate such motor deficiencies, leading to further drive complexity.

In all sinewave methods, the essential part is to smoothly transfer the torque vector from one coil to the next with minimum torque ripple. In single coil BLDC control, such smooth transfer is not possible, because the torque has to go through zero at the point where rotor north pole transits to a south pole.

In a single coil motor the trapezoidal method cannot be applied because there is no undriven coil, also FOC methods are not obvious because of the strong non-linear nature of the single coil fan torque every 180 electrical degrees.

Moreover, sensored trapezoidal three phase solutions are using three hall sensors, which are spaced 60 degree or 120 degrees apart. This allows to ensure the startup of the fan occurs in the wanted direction. Similar for single coil fans a single hall element or hall sensor is applied. Since no spacing between multiple hall sensors is required, such hall sensor can easily be integrated into the motor controller. The startup direction of such single coil motors is typically ensured by magnetic design of the motor, in which the reluctance zero point is slightly offset by adjusting the stator shoe design. Intelligent commutation methods for single coil motors, referred to as soft switching, require speed information of the fan rotation, in order to smoothly control the transition of the current. At start up no speed information is available. Therefore at startup of a single coil BLDC motor the driving methods for driving a single coil brushless DC motor may be subdivided, as illustrate in FIG. 1, in 3 steps. First the position of the rotor is detected, next the rotor is accelerated, and finally the motordriver enters a steady state operation mode. The steady state operation usually has the highest performance requirements, for instance lowest noise, highest speed, highest efficiency. While during position detection and acceleration, some loss of performance may be acceptable in exchange for increased robustness. During steady state operation some robustness may be exchanged to achieve maximum performance.

The left flowchart of FIG. 1 shows a possible driving method in case of hall-sensor based prior art motor drivers. The rotor position is detected by the hall sensor and next the rotor is accelerated according to a startup procedure. The startup procedure can be left, for instance as soon as the hall sensor has toggled at least once. In some advanced fandrivers multiple start up procedures or acceleration procedures may exist, which each have their exit criteria. At one point in time the steady state operation mode is entered, in which the hall sensor signal is used to define the timings for controlling the commutations, in a way which is optimized for steady state performance, such as for instance low noise operation, high efficiency, etc. Some advanced prior art hall-sensor based single coil motor drivers apply predictive control, in which the commutation procedure is initiated some time prior to the BEMF_ZC. This allows to optimize the energization wave forms for acoustic noise, robustness, maximum torque or any combination. Also for sensorless motor drivers such three steps can be distinguished in which the hall sensor input is replaced by an alternate method, as illustrated in the right flow chart of FIG. 1.

Some prior art single coil motor drivers start up by applying a pulse width modulated driving signal with an output duty cycle DCout=100%, until the hall sensor has toggled at least one time. If the hall sensor does not toggle within a time Ton, the fandriver enters LRP (Locked Rotor Protection). After a time Toff, the fandriver retries to start. Typically, the ratio Ton/Toff is between ⅕ and ⅒.

A disadvantage of such start up method, is that an excessive inrush current may be drawn, especially for low ohmic coil resistance applications. Such excessive peak currents may also lead to audible noise when the fan starts up.

Therefore, in more advanced prior art motor drivers, different energization wave forms are applied, which are referred to as soft start waveforms.

FIG. 2 shows a typical example of a startup energization wave form for a hall sensor based motor driver, in which the duty cycle output DCout is progressively increasing from 50%. If the motor driver hall sensor toggles three times, the motor driver will adjust its output duty cycle DCout from its actual value to the requested value by the PWM input. Two examples are given in the left picture, in which the PWMinput is either 80%, or 10%.

In the right image the situation is shown in case of Locked Rotor Position (LRP). DCout increases until 100% at, and then remains flat until Ton. It is clear for the technical expert that many variants on such energization wave form can be realized.

Also during initial acceleration, or in case of sudden load changes, predictive algorithms which rely on previous timing information, are vulnerable. Therefore, they should be complemented by robust driving methods, which allow to converge towards and seamlessly enter into more high-performing predictive driving methods.

Therefore, there is need for controlling single coil brushless DC motors in a sensorless way which are more robust as complement to high-performing sensorless methods during non-steady state operation of the motor.

SUMMARY OF THE INVENTION

It is an object of embodiments of the present invention to provide a robust system and method for controlling a single coil brushless DC motor, especially suited for, but not restricted to, non-steady state operation of the motor. It can be understood that the robust methods described in this patent can also be used during steady state operation, at cost of some performance compared to other more performing methods.

The above objective is accomplished by a method and device according to the present invention.

In a first aspect embodiments of the present invention relate to a method for controlling a single coil brushless DC motor, the method comprising at least a first EHP sequence which comprises:
driving the motor using a driving signal during a torque generating period, to accelerate the motor, such that during a subsequent generator mode period a phase current goes in generator mode,
driving the motor during the generator mode period using a generator mode signal, which allows the phase current to be in generator mode,
monitoring the phase current during the generator mode period thereby obtaining phase current information,
and determining parameters of a next EHP sequence based on the obtained phase current information.

In embodiments of the present invention part of the obtained phase current information is timing information comprising a first zero crossing moment of the phase current and/or a second zero crossing moment of the phase current and/or a zero crossing moment of a time derivative of the phase current in between the first and the second zero crossing moment of the phase current.

In steady state operation, the parameters of a next EHP sequence, such as the shape and timing of the driving signal of the next EHP sequence, are determined based on timing information from previous EHPs. It is thereby advantageous that the obtained timing information in indicative for the rotor position and the rotor dynamics and thus can be used for determining a good further driving signal. This driving signal cannot be derived from previous timing information during startup because there were no previous commutations or during disturbed operation of the motor because the EHP change rate is unstable or unknown. It is an advantage of embodiments of the present invention that a suitable shape of the further driving signals can be found to approximate the BEMF_ZC position without or with limited predictive time information, by analyzing the timing information of the phase current when the motor is in generator mode (i.e. phase current is negative). This generator mode is achieved by reducing the driving signal (applying a shape of a falling edge soon enough) such that on one hand the motor still receives sufficient energy to maintain rotation speed or accelerate, whilst on the other hand such that the driving strength is low enough, and preferably has dropped to DC=0% (i.e. freewheeling), such as to allow the BEMF to invert the current direction into generator mode before the BEMF_ZC is reached. In such condition, each commutation will reflect at least 3 current zero crossings. The first two current ZCs are induced due to the generator mode, the third may then be the actual motor commutation. In between the two zero crossings there is a peak in the current or ZC of the time derivative of the phase current. These three timing informations obtained during generator mode can be used to define the shape of further driving signals.

It is an advantage of embodiments of the present invention that, when starting up a single coil brushless DC motor, the shape of the current in generator mode is indicative for the zero crossing of the BEMF voltage. The BEMF voltage zero crossing moment can be used to estimate the rotor position and therefore the shape of the current in generator mode can be used, when starting up a single coil brushless DC motor, for determining the parameters of a next EHP sequence (e.g. the start moment of a further driving signal).

This is for example different for US2016118916 where there is only one current zero crossing for each commutation and this approximately at the commutation point. See for example FIG. 8A which shows a case where the current phase leads and FIG. 8B where the current phase lags. Since, in US2016118916 the motor is not driven such that it goes in generator mode, the phase current is also not monitored during the generator mode period to obtain phase current information. As this phase current information is not obtained, it can also not be used for determining the parameters of a next EHP sequence.

A motor driving apparatus according to US2016118916, on the other hand, comprises a Hall sensor for obtaining a position of the rotor and a current monitoring circuit for asserting a zero current detection signal when a reversion of direction of a coil current flowing into the motor coil is detected.

Nowhere in US2016118916 is indicated to obtain phase current information during the generator mode period and to use this information for determining parameters of a next EHP sequence.

In embodiments of the present invention the determining step comprises determining a rising edge and/or a falling edge of a driving signal of the next EHP sequence based on the obtained phase current information.

In embodiments of the present invention the rising edge of the further driving signal is determined directly after the second zero crossing moment of the phase current, or directly after the first zero crossing moment of the phase current or directly after the zero crossing moment of the time derivative of the phase current or in between the first and the second zero crossing moment of the phase current or in between any combination of two of those.

In embodiments of the present invention a start moment of the falling edge of the driving signal is determined such that the first and the second zero crossing moment of the phase current are closer together for the next EHP sequence than for a previous EHP sequence.

In embodiments of the present invention the monitoring step comprises obtaining a generator mode peak current value of the phase current during the generator mode period at the zero crossing moment of the time derivative of the phase current in between the first and the second zero crossing moment of the phase current, and the determining step comprises determining parameters of a next EHP based on the obtained timing information and on the obtained generator mode peak current value.

If the BEMF voltage is large, the induced phase current in generator mode will be larger, as compared to when the BEMF signal is already weakening due to the imminent BEMF_ZC. Therefore, the peak current value can be used as input to define how far the BEMF_ZC is in the vicinity of the first ZC point. Since the peak current value will depend on the BEMF strength, it is also depending on the speed of the motor. Therefore, in preferred embodiments of this invention, the speed information is used in the interpretation of the peak value of the phase current. It is an advantage of embodiments of the present invention that the smaller the absolute value of the generator mode peak current, the closer the BEMF_ZC location is to the first zero crossing moment of the phase current. The smaller the absolute value of the generator mode peak current, the closer the first zero crossing moment, the second zero crossing moment and the time derivative of the phase current will be together. The larger the absolute value of the phase current, the more the BEMF voltage zero crossing will be located towards the second zero crossing moment of the phase current.

In embodiments of the present invention the monitoring step comprises capturing current information while driving the motor during the torque generating period wherein a driving current value indicative for the phase current is captured. The start moment for driving the motor using the further driving signal is then determined based on the ratio of the generator mode peak current value and the driving current value such that the start moment is closer to the first zero crossing moment of the phase current when the absolute value of the ratio is smaller.

In embodiments of the present invention the phase current during the torque generating period is indicative for the speed of the driven motor. It is thus advantageous that the generator mode peak current amplitude can be evaluated in a ratio compared to the driving current value to make the interpretation of the peak current less dependent on the motor parameters, and the applied speed, and applied duty cycle DCout for determining the driving signal of a further EHP sequence.

In embodiments of the present invention the method comprises iterations wherein the steps of driving the motor during the torque generating period, driving the motor during the generator mode period, monitoring the phase current, and determining parameters of a next EHP sequence are repeated, the next EHP sequence comprising a further driving signal wherein a further driving signal of an iteration corresponds with a driving signal of the next iteration.

The rising edge and the falling edge of the further driving signal may be determined. The start moment of the rising edge of the further driving signal of an iteration may for example be directly after the second zero crossing moment of the phase current of that iteration. The further driving signal of one iteration is the same as the driving signal of the subsequent iteration.

It is an advantage of embodiments of the present invention that the rotational speed of the motor can be increased by repeating the steps of driving the motor using a driving signal, monitoring the phase current and capturing the first zero crossing moment and/or the second zero crossing moment of the phase current and/or the zero crossing of the derivative of the phase current between the first and second zero crossing moments of the phase current during the generator mode period. In embodiments of the present invention the driving, monitoring and capturing steps may be repeated to achieve a predetermined rotational speed.

In embodiments of the present invention the driving, monitoring, and determining steps are repeated until the time between the first zero crossing of the phase current and the second zero crossing of the phase current is smaller than a predefined generator period and/or as soon as the absolute value of the generator mode peak current is positive or smaller than a predefined current threshold.

In embodiments of the present invention parameters of at least one EHP sequence are determined based on predefined signal parameters.

It is an advantage of embodiments of the present invention that, for example when the motor is driven for the first time using the driving signal, this driving signal may be determined based on predefined signal parameters. These predefined signal parameters may for example be selected for a specific motor and/or for specific load conditions. The driving signal may for example have a predefined power level, and/or a predefined driving period, and and/or a predefined shape. The timings of the falling edge of the driving signal may be preset. The predefined signal parameters may be stored in a lookup table.

Also at least one further driving signal may be determined based on predefined signal parameters. However, it may also be determined based on previous driving signals and based on previous zero crossing moments of the phase current and of the time derivative of the phase current. In embodiments of the present invention the predefined signal parameters are configurable. It is an advantage of embodiments of the present invention that the driving signal can be modified depending on the operating conditions of the motor. This may for example be achieved by a resistor or capacitor, and/or it may be achieved by a discrete component for configuring an input to a motordriver chip for driving the motor, and/or it may be achieved by a PWM input, and/or it may be achieved by an EEPROM input, and/or it may be controlled based on temperature.

In embodiments of the present invention the motor is driven from standstill and driving the motor using the driving signal and monitoring the phase current are repeated until the motor starts rotating and the driving signal is changed such that a power of the driving signal is increased over the iterations.

This may be achieved by gradually increasing the driving period and/or the power level of the driving signal and/or by changing the shape of the driving signal between iterations. It is an advantage of embodiments of the present invention that the power supplied to the motor can be gradually increased until the motor starts rotating. This allows for example to avoid peak currents and to decrease the noise during startup.

In embodiments of the present invention after each iteration the motor is driven with a modified first driving signal shape, such that a retrial period is present between subsequent driving signals, wherein the retrial period is adjustable.

It is an advantage of embodiments of the present invention that the shape of the first driving signal is modified, for instance gradually increased to be more aggressive, and ultimately even apply a full 100% duty cycle from the start, or that the time over which the shape of the first driving signal is applied is increased, for instance apply a driving shape over 0.2 sec, and increase progressively to 1 sec or more. It is an advantage of embodiments of the present invention that a combination of modifying the shape and timing of the driving signal can be applied.

It is an advantage of embodiments of the present invention that a retrial period is present between iterations and that his retrial period is adjustable. The retrial period may for example be controlled base on the chip junction temperature of the motor driver chip. For instance at cold junction temperature (ex −40 C), the retrial period can be reduced, for instance to 0.1 sec, while for hot junction temperatures (ex +125 C), the retrial period can be increased to a multiple of the drive period (for instance 10 times the drive period), or to a fixed max value.

In embodiments of the present invention the parameters of the next EHP sequence are determined based on signal parameters of a previous driving signal and/or based on previously captured zero crossing moments in between which the phase current is in generator mode and/or of the time derivative of the phase current is in generator mode.

The driving period of the further driving signal may for example be determined based on the driving period of a previous driving signal and/or based on the duration of a previous EHP sequence (which comprises the driving signal followed by the generator mode period (e.g. freewheeling) period). The power level of the further driving signal may for example be determined based on the power level of the previous driving signal.

The signal parameters of the driving signal may be determined such that over the iterations of driving signals the motor is driven with an increased power of the driving signal. It is thereby advantageous that an increased speed of the motor may be achieved.

It is an advantage of embodiments of the present invention that the driving period and or the sequence duration of a previous EHP sequence can be used to determine the driving period of the driving signal for the next EHP sequence. The sequence duration gives an indication of the rotor speed and therefore can be used for determining the driving period of the further driving signal. The driving period and the power level of the previous driving signal together with the sequence duration give an indication of the impact of the driving signal on the motor speed and therefore can be used to define the further driving signal.

It is an advantage of the embodiments of the present invention that the load and/or mechanical inertia of the fan can be estimated during the first iterations, and the subsequent driving signals can be adjusted to match the load and/or mechanical inertia, in order to improve the control, and possibly converge faster to move out of generator mode.

In embodiments of the present invention the method comprises triggering leaving the control method and starting another operational method of the brushless DC motor.

It is an advantage of embodiments of the present invention that a robust method is provided to capture timing information needed for initializing less robust control methods which are more suited for driving the motors with higher performance, such as lower noise and higher efficient by avoiding the need for generator mode.

In embodiments of the present invention a trigger moment may be obtained based on a rotation signal which is indicative for a rotation speed of the motor.

The rotation signal which is indicative for the rotation speed of the motor may for example be the sequence duration of an EHP sequence. The trigger moment may be that moment when the sequence duration drops below a predefined (configurable) duration threshold. The duration threshold may be selected such that when the sequence duration drops below this threshold, the zero crossing moment of the phase current is not indicative anymore for the BEMF voltage ZC.

In embodiments of the present invention the difference between the sequence duration $t2x$ of one EHP sequence and the sequence duration of the previous EHP sequence $t2x-1$ may be compared with a threshold. The trigger moment is in this case the moment when the difference becomes smaller than the threshold.

The rotation signal which is indicative for the rotation speed of the motor may alternatively be the duration the first EHP sequence. If this duration is shorter than a threshold, the steady state operation may be triggered. The first EHP sequence thereby corresponds with the sequence of the first time the driving signal is applied to the motor followed by a generator mode period (e.g. freewheeling period).

In embodiments of the present invention a trigger moment may be obtained when the ratio of the time between the two zero crossing moments of the phase current compared to the full EHP is below a threshold.

In embodiments of the present invention, triggering the other operational method comprises passing signal parameters of at least one driving signal and/or passing previously captured zero crossing moments to the other operational method.

It is an advantage of embodiments of the present invention that a smooth transition to the other operational method can be realized.

In a second aspect embodiments of the present invention relate to a device for starting up a single coil brushless DC motor. The device comprises:
a driver configured for driving the single coil brushless DC motor using a driving signal during a torque generating period, to accelerate the motor, such that during a subsequent generator mode period a phase current goes in generator mode, and for driving the motor during the generator mode period using a generator mode signal, which allows the phase current to be in generator mode,
a current sensor configured for monitoring the phase current during the generator mode period thereby obtaining phase current information,
wherein the device is configured for determining parameters of a next EHP sequence based on the obtained phase current information.

In embodiments of the present invention part of the obtained phase current information is timing information comprising a first zero crossing moment of the phase current and and/or a second zero crossing moment of the phase current and/or a zero crossing moment of a time derivative of the phase current in between the first and the second zero crossing moment of the phase current.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIGS. 3(A) and 3(b) show the timing when starting up a single coil brushless DC motor from stand still using a method in accordance with embodiments of the present invention.

Figure 1:
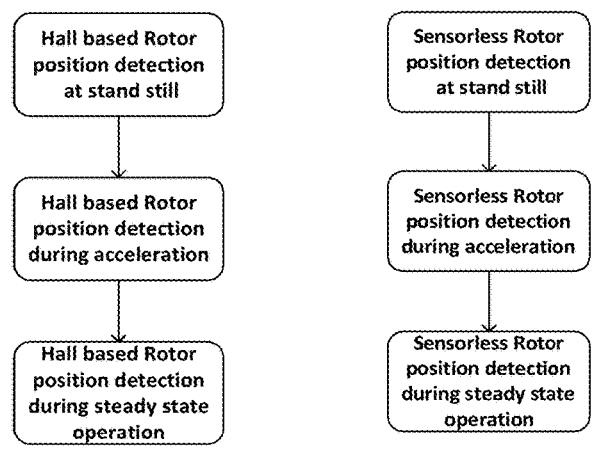
FIG. 1 shows a possible prior art startup scheme of a brushless DC motor.
Figure 2:
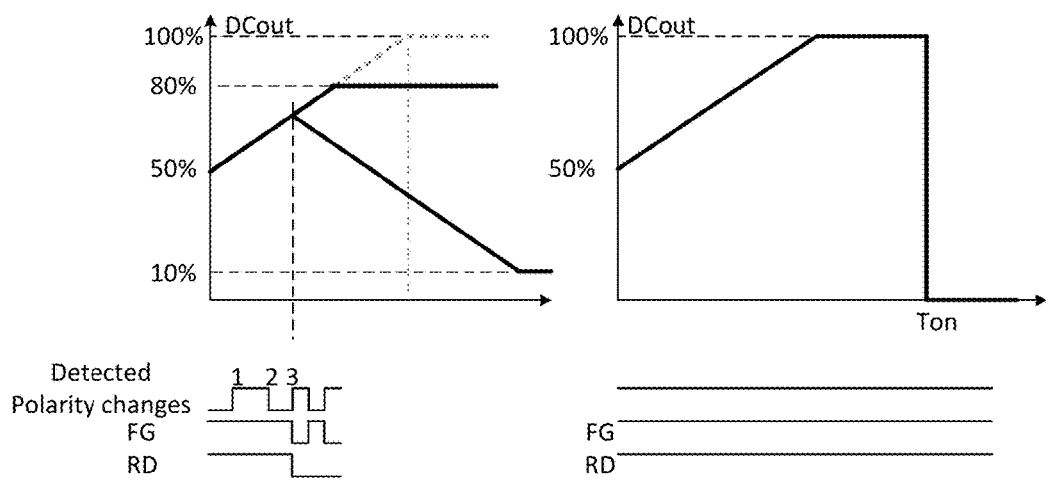
FIG. 2 shows possible prior art driving signals in function of time.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to the driving signal, reference is made to the signal which generates a current through the motor coil of the single coil BLDC motor. The current may be generated by an average voltage difference over the motor coil generated by the full bridge output driver. The driving signal may be a pulse width modulated (PWM) signal, or a linear controlled signal.

The average voltage difference is just a means to produce the phase current in the single coil BLDC motor.

The average voltage difference across the motor coil in case of an embodiment with supply VDD, may be anywhere between 0V and VDD. The current scales up accordingly.

In a PWM driving method, the voltage is provided with a time interrupted way resulting in an average voltage difference over the coil. When neglecting resistive losses in the bridge driver and the motor coil of the single coil BLDC motor, the average voltage difference is 12V when driving the motor with a supply voltage VDD=12V and a DCout=100% PWM. With e.g. a DCout=50% PWM driving signal the average voltage difference is 6V over the coils. Also, when applying the PWM driving method the phase current scales up accordingly, and can be represented as Iphase=(VDD*DCout−BEMF)/Z, in which Z is the impedance of the bridge driver and the motor coil, and in which BEMF is the Back Electromotive Force induced into the coil by the rotating permanent magnets on the rotor.

In a linear driving method, the average voltage difference is realized by adjusting the resistive losses in the bridge driver, and by dissipating the excess energy in the bridge driver.

The current in the coil determines the torque that the single coil BLDC motor provides. Depending on the mechanical load of the motor, in an open loop controlled system the torque will develop to a given speed. In a closed loop system, the regulation loop will adjust the motor torque in order to reach or maintain a target speed.

Independent of the driving signal with a given voltage difference over the coil and resulting current in the coil, in brushless DC motors, the motor must be commutated depending on the position of the rotor. In single coil BLDC motors, the current direction in the single coil must change its polarity under the use of a commutation method.

Where in embodiments of the present invention reference is made to an electrical half period (EHP), reference is made to a period of 180 electrical degrees, which is starting at the start of the rising slope of a driving signal, and ends at the start of the rising slope of the next driving signal.

Where in embodiments of the present invention reference is made to an EHP sequence, reference is made to the sequence of driving a motor using a driving signal during a torque generating period followed by a generator-mode (e.g. freewheeling) period. An EHP sequence starts at the start of a torque generating period, includes a generator mode period, and ends at the start of the next torque generating period. The driving signal may be a voltage controlled signal, for example using a PWM duty cycle or through linear control of the power bridge.

Where in embodiments of the present invention reference is made to signal parameters of the driving signal, reference is made to some or all of the parameters which are required to define the driving signal. These parameters may for example be the power level, the driving period, the shape of the driving signal (e.g. characteristics of the rising edge and/or of the falling edge of the driving signal which may be expressed in a current through the coil or as a voltage over the coil, such voltage can be controlled in a linear way or using PWM duty cycles to adjust the applied DC supply voltage to the dedicated value needed to achieve the target shape), etc.

Where in embodiments of the present invention reference is made to a start moment of a driving signal which is "directly after" the second zero crossing moment (t2$x$) of the phase current, reference is made to a start moment which is 20% of the EHP, or even within 10% of the EHP after or even within 5% of the EHP after the second zero crossing moment or even within a shorter period after the second zero crossing moment. In other embodiments of the present invention, the start moment of a driving signal may be directly after the first zero crossing moment (t1$x$) or directly after the time derivative zero crossing moment that falls during generator mode (t3$x$). In these embodiments "directly after" also refers to 20% of the EHP, or even within 10% of the EHP after or even within 5% of the EHP after the respective moments t1$x$ or t3$x$.

Where in embodiments of the present invention reference is made to a phase current which goes in generator mode, reference is made to a phase current which is essentially generated or dominated by the induced BEMF voltage into the rotor coil caused by the rotation of the permanent magnet rotor, due to absence or weak presence of a driving signal controlled by the driver. Weak refers to for instance less than 30% of the average driving strength of the driver during the torque period, and is preferably 0% of the average driving strength of the driver during the torque period, for instance by applying a duty cycle Dcout=0%.

In a first aspect, embodiments of the present invention relate to a method for controlling a single coil brushless DC motor. The method comprising at least a first EHP sequence which comprises:

driving 120 the motor using a driving signal, during a torque generating period, to accelerate the motor, such that during a subsequent generator mode period a phase current goes in generator mode, driving 130 the motor during the generator mode period using a generator mode signal, which allows the phase current to be in generator mode, monitoring 140 the phase current during the generator mode period thereby obtaining phase current information, the phase current information may for example comprise timing information such as a first zero crossing moment of the phase current (t11) and and/or a second zero crossing moment (t21) of the phase current and/or a zero crossing moment (t31) of a time derivative of the phase current in between the first and the second zero crossing moment of the phase current, and determining 110 parameters of a next EHP sequence based on the obtained phase current information. The parameters of the next EHP sequence may for example be determined based on timing information such as the first zero crossing moment of the phase current and and/or the second zero crossing moment of the phase current and/or the zero crossing moment of the time derivative of the phase current in between the first and the second zero crossing moment of the phase current.

Monitoring the phase current may also imply monitoring the time derivative of the phase current.

In embodiments of the present invention the next EHP sequence comprises driving the motor using a driving signal also referred to as the further driving signal. A start moment for driving 120 the motor using the further driving signal may be determined directly after the second zero crossing moment, after the first zero crossing moment or directly after the zero crossing moment of the time derivative of the phase current or in between any combination of two of those.

In embodiments of the present invention the method comprises initializing step 100 for initializing parameters for the EHP sequence (such as the timing and shape of the driving signal, and the timing and shape of the generator mode signal). The driving signal may be used for driving the motor from startup thus generating the first EHP.

The period during which the motor is driven using the driving signal is also referred to as the torque generating period (T_torque).

During the torque generating period T_torque the motor is accelerated using the driving signal. The timing, and/or shape, and/or driving period and/or power level of the driving signal are determined such that during a subsequent generator mode period a phase current goes in generator mode.

During the generator mode period the generator mode signal is low enough (even no signal may be applied) to allow the generator mode signal to be in generator mode. During the generator mode period T_gen the generator mode signal (e.g. the applied voltage) is reduced partially or completely (i.e. freewheeling or duty cycle=0%) but not changed of sign, before the BEMF voltage induced by the permanent magnet rotor into the coil (referred to as the BEMF) reaches the zero crossing (BEMF_ZC). The applied generator mode signal during T_gen is characterized by ensuring that the generator mode signal (e.g. voltage drive signal) is low enough to allow the BEMF to alter the direction of the phase current compared to the direction of the current during the preceding T_torque.

Figure 5:
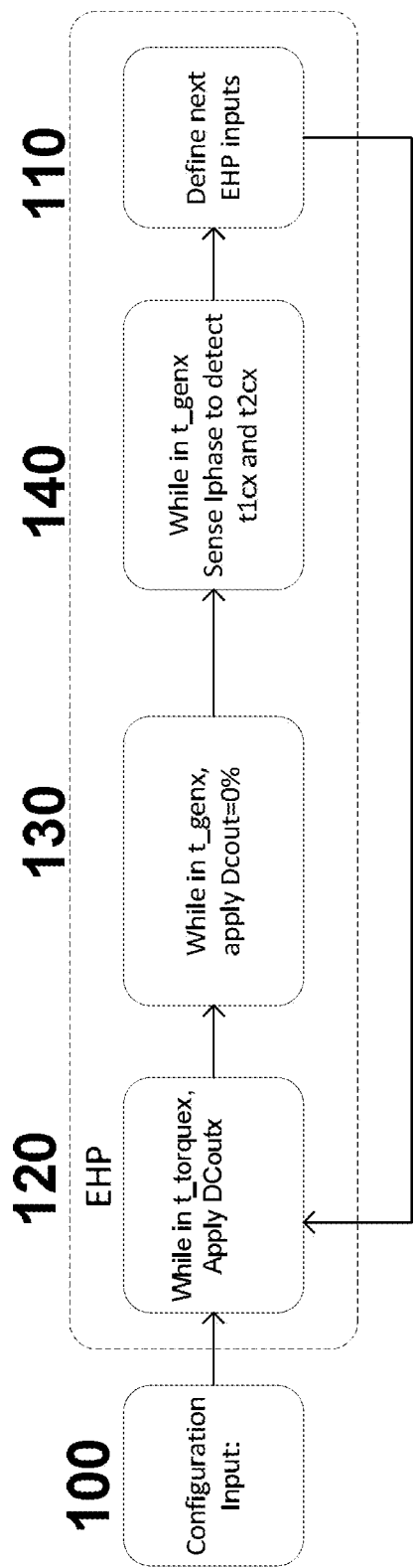
FIG. 5 illustrates a flow chart comprising steps of a method in accordance with embodiments of the present invention.
Figure 6:
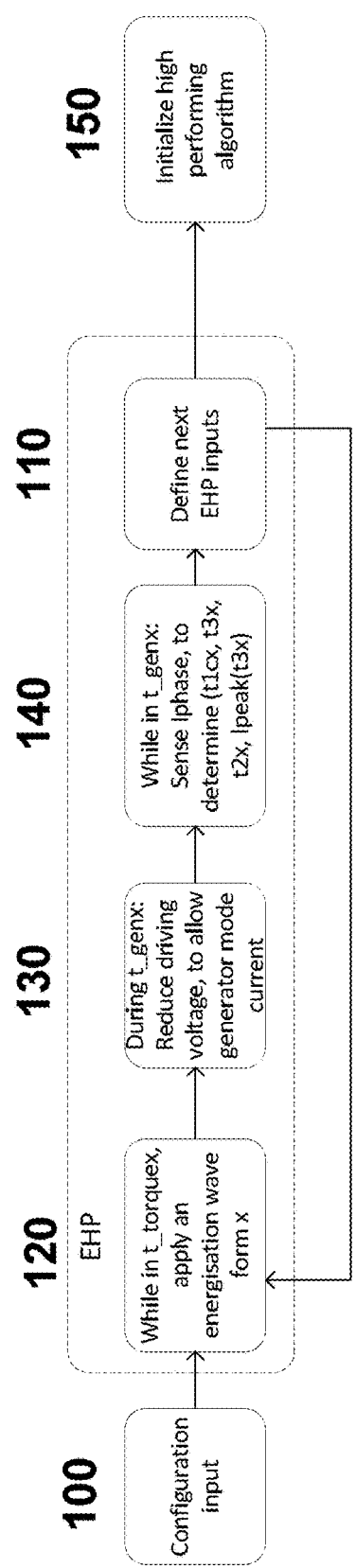
FIG. 6 illustrates a similar flow chart as in FIG. 5 with an additional step triggering the start of another operational method and with a loop for driving the motor with a sequence of driving signals in accordance with embodiments of the present invention.

These steps are also illustrated in the flow charts shown in FIG. 5 and FIG. 6. In the examples of FIG. 5 and FIG. 6, driving the motor using a driving signal comprises applying an energization waveform to the 1-coil motor. In these figures, the torque driving step 120 is followed by a generator mode step 130, and a monitoring step 140 wherein the phase current is monitored.

In FIG. 5, a basic implementation is shown, in which during T_gen, DCout=0%, only the two zero crossings of the phase current t1x and t2x are captured. The next EHP sequence is then defined based on the captured timing information of the latest T_gen, and/or any previous T_gen, and/or the initial timing information.

In FIG. 6, a more advanced implementation, according to embodiments of the present invention, is shown.

After initialization 100 of the first EHP, which includes setting the timing information for T_torque, and the driving signal to be applied during T_torque, and generator mode signal during T_gen, the following steps are applied:

Driving 120 the motor using the driving signal during the torque generating period T_torque, thereby accelerating the motor;

Driving 130 the motor during the generator mode period T_gen using the generator mode signal;

Monitoring 140 the phase current to capture parameters t11, t21, t31 and the phase current at moment t13: Ipeak(t31);

Defining 110 the parameters for the next EHP sequence (such as the timing and shape of the driving signal, and the timing and shape of the generator mode signal) for the next EHP sequence, based on the monitored phase current 140, and/or based on the parameters from the initialization 100. An estimation of the BEMF_ZC may be done based on the captured parameters.

During a second EHP, the driving, monitoring and determining steps 120/130/140/110 are repeated to define the timing parameters and the energization wave form of the next EHP sequence, and so on. In embodiments of the present invention it is possible to combine parameters of multiple T_gen to define a next EHP sequence.

After a predefined number of EHPs, or as a result of the definition 110 of the parameters of the next EHP sequence, another control algorithm may be triggered which may avoid the need for the generator mode, in order to improve the noise and/or efficiency performance and/or maximize the torque.

Parameters for initializing the next EHP sequence may be fixed parameters of a controller, they may be stored in memory of the controller, they may be set using external components, such as capacitors or resistors, or they may be obtained through dedicated sensing algorithms, for instance sensing algorithms which measure motor characteristics, such as the coil resistance, and/or the coil inductance. When driving a single coil brushless DC motor, the zero crossing of the BEMF (back electromotive force) voltage may be used for estimating the rotor position and hence for driving the motor. In embodiments of the present invention the BEMF voltage zero crossing may be estimated between the first zero crossing moment of the phase current and the second zero crossing moment of the phase current or at the second zero crossing moment of the phase current. This is advantageous because the BEMF voltage zero crossing reveals the rotor position and hence can be used for synchronizing the driving of stator coils with the rotor rotation.

It is found by the inventors that during T_gen, the BEMF voltage zero crossing is located between the first zero crossing moment of the phase current (tx1) and the second zero crossing moment of the phase current (tx2) during this T_gen. It is thus an advantage of embodiments of the present invention the BEMF voltage zero crossing can be estimated based on these zero crossing moments of the phase currents during T_gen.

In improved embodiments of the present invention the BEMF voltage zero crossing moment the location of the BEMF_ZC is further refined by additionally using the timing information of the zero crossing moment of the time derivate of the phase current which is located between the first and second zero crossing moments of the phase current (tx3). The BEMF_ZC is then located between tx3 and tx1. When using all this timing information (tx1, tx1, tx3) a more accurate estimation of the BEMF voltage zero crossing can be obtained.

If t1x falls proportionally to the EHP far before BEMF_ZC, then t3x will be following proportionally close to t1x, and t2x is a good approximation of BEMF_ZC. As t1x approaches BEMF_ZC, t1x will proportionally shift towards t2x, and BEMF_ZC will shift from t2x towards t3x.

In even further improved embodiments of the present invention, also the peak current at t3x Ipeak(t3x) is used for refining the prediction of the BEMF_ZC. In a preferred embodiment, a peak current ratio is used. Such peak current ratio is defined by comparing Ipeak(t3x) to the average supply current during T_torque, or other values which are proportional to the average supply current during T_torque. Examples of such proportional values can be the peak current during T_torque; or a stored current value, which is scaled according to the applied duty cycle during T_torque. As the peak phase current ratio reduces, BEMF_ZC is shifting closer to t3x.

This is illustrated in the following graphs wherein different signals of a single coil current BLDC motor are shown in function of time.

FIG. 3(A) shows the timing when starting up a single coil brushless DC motor from stand still with just one torque period (T_torque1), followed by a long generator-mode period (T_gen1). For simplicity of the figure, the applied duty cycle during T_torque1 is constant, and is fixed to 0% during T_gen1. In practical examples, soft switching slopes may be added to ensure more smooth transitions. Even though not preferred, it can be imagined, to apply some Z state during T_gen1 to reduce the breaking effect of the freewheeling, or to apply a small duty cycle, as long as the duty cycle is significantly smaller than the duty cycle applied during T_torque, for instance 5 times or 10 times. FIG. 3(A) shows, that immediately after applying DCout=0%, the current is dropping to zero, and at time t11 it transits into generation mode. At t21 the BEMF_ZC is coinciding with the second current zero crossing. Basically the current remains in generator mode, and changes sign together with the BEMF.

FIG. 3(B) shows the same case, but now a second torque period T_torque2, which is started applied exactly at t21. This second EHP further accelerates the fan. In this second EHP, T_torque2 is shorter than T_torque1. Since the fan speed at the start of T_torque2 is higher than at the start of T_torque1 (fan was standing still), the BEMF_ZC can be expected to come sooner. Just like in T_torque1, t1x is applied soon enough as to ensure that the phase current immediately goes into generator mode during T_gen2. A third torque period T_torque3 is initiated at the second zero crossing moment t22. In FIG. 3(B) the applied duty cycle in each T_torque has been kept constant. As the fan increases speed, and the BEMF amplitude increases, the current during T_torque increases, and the peak current Ipeak(t3x) is increasing. Just like in prior art, also a soft start can be applied in which the duty cycle is increasing progressively in line with the increased fan speed, in order to avoid high inrush currents at start up. As shown in FIGS. 3(A) and 3(B) an EHP starts at the rising slope of a driving signal (i.e. at the start of a torque generating period), and ends at the start of the rising slope of the next driving signal (i.e. at the start of the next torque generating period).

Figure 4A:
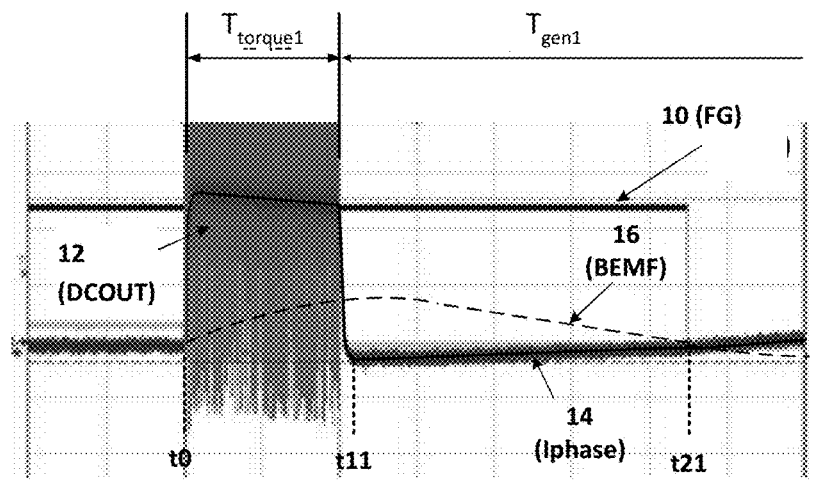
FIGS. 4(A) and 4(B) show scope plots of motor signals when driving a motor in accordance with embodiments of the present invention.
Figure 4B:
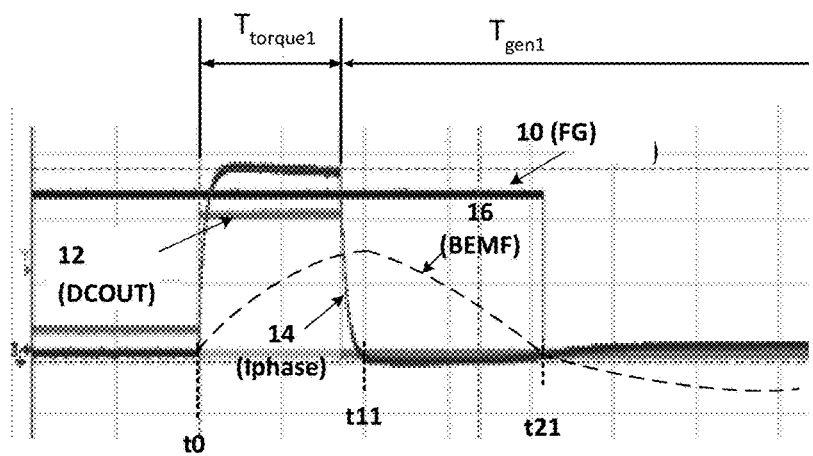

FIGS. 4(A) and 4(B) show scope plots of T_torque1 and T_gen1, for A) Dcout=20% and B) for DCout=100%. The FG signal represents the BEMF_ZC, as it is detected by a hall sensor. Because with DCout-100%, more torque is applied, the applied time for T_torque1 is shorter compared to DC=20%. In either cases, it is shown that the BEMF_ZC coincides with t2x.

In FIGS. 3(A) and 3(B) and FIGS. 4(A) and 4(B) the moment t0 is the moment at which the motor is started from stand still. This is the start moment for driving the motor using a torque signal. The torque signal may for example be a PWM driving signal, or a linear controlled signal.

Figure 7:
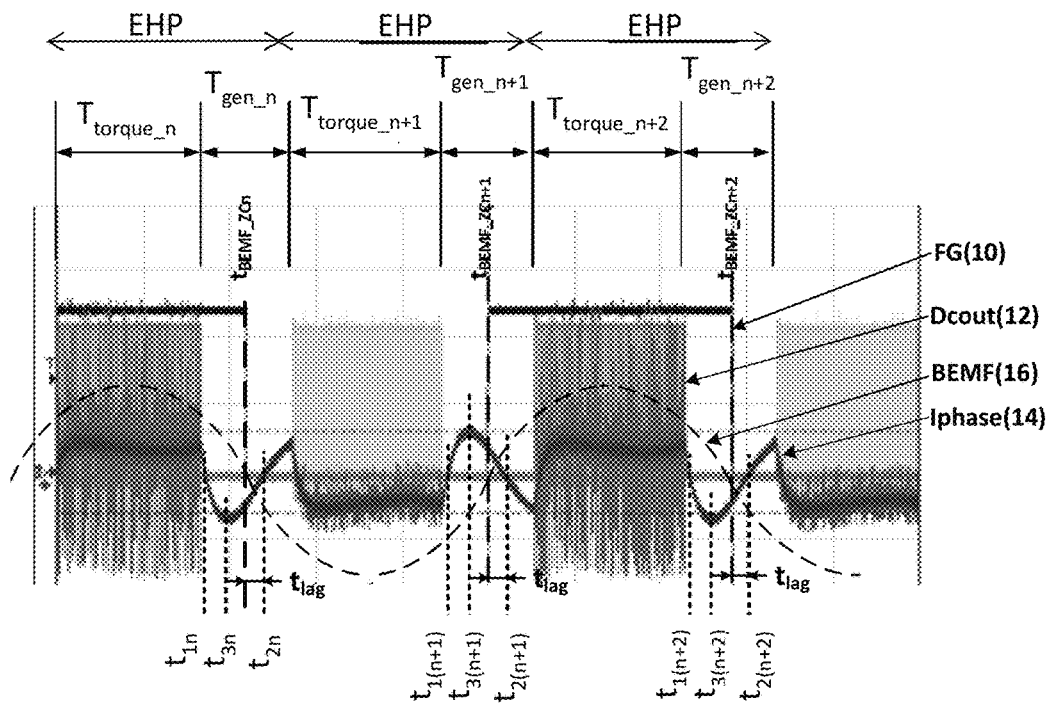
FIG. 7 and FIG. 8 show the output duty cycle, the Hall sensor based commutation signal FG, and the phase current in function of time of a single coil brushless DC motor driven using a control method in accordance with embodiments of the present invention.
Figure 8:
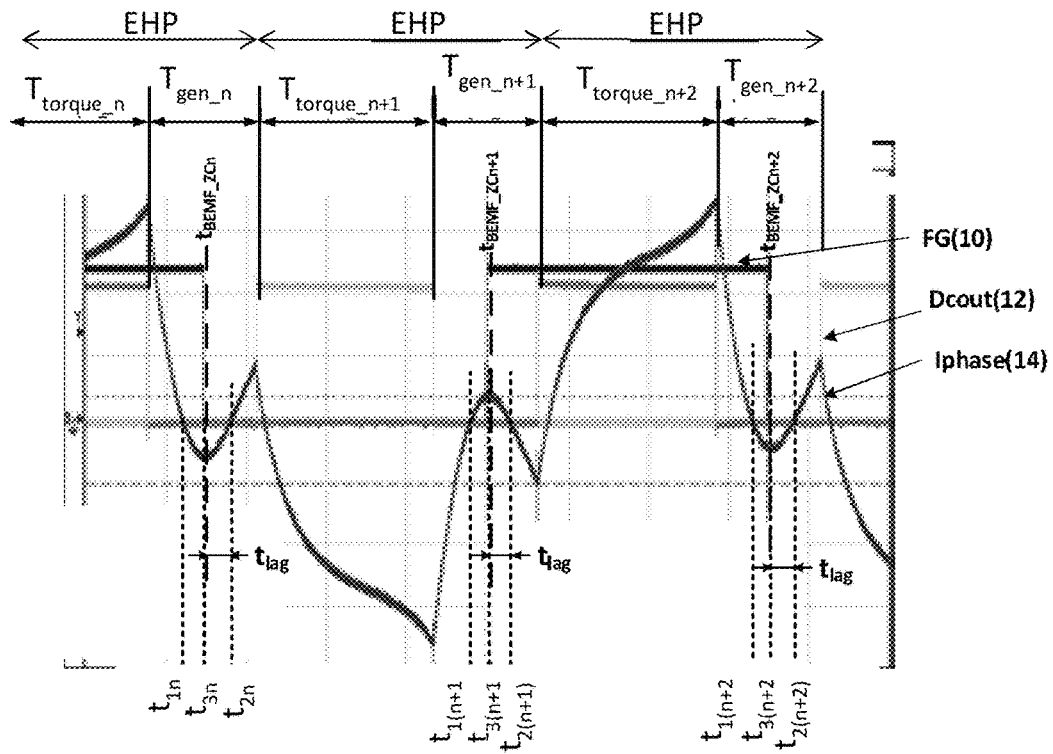

FIGS. 4(A) and 4(B), 7 and 8 show the signals DCOUT 12, Iphase 14, and BEMF 16. In FIGS. 4, 7 and 8 the Hall sensor based FG (10) commutation signals are present for illustrative purpose only. They are not required for starting up the motor using a method in accordance with embodiments of the present invention.

In the example illustrated in 4(A) and 4(B) the phase current that was generated by DCout*VDD during T_torque1, is immediately consumed into torque as soon as DCout=0% during T_gen1. During T_gen1, the little BEMF that is present in the coil from the slow spinning fan, induces a negative generator-mode current (a current in the opposite direction), which follows the BEMF voltage. The "negative" generator-mode current which flows during T_gen1 brakes the motor, as opposed to the "positive" current which flows during T_torque, which accelerates the fan. For this reason, such generator mode will cause noise, due to the torque ripple (change from acceleration to braking). Such subsequent braking after acceleration will impact the efficiency in a negative way. Therefore, even though such generator mode current can be used as an easy estimate of the zero crossing of the BEMF voltage ($t_{BEMF\_ZC}$), the generation mode period must be estimated in a reasonable window. If it is too small, the BEMF_ZC may be missed. If the generation mode period is too long, the start may take a long time because braking during generator mode may cancel a significant amount of the acceleration achieved during the previous driving period, ultimately the fan may not start up at all.

In the examples illustrated in FIGS. 3(A) and 3(B) and FIGS. 4(A) and 4(B), at startup, the fan time constant Lcoil/Rcoil is small compared to the motor commutation time, for instance Lcoil/Rcoil~200 us or 500 us, or even 2 ms, while the first EHP may be 100 ms or more. Therefore, any induced lag in the current is not visible.

In FIG. 7 and FIG. 8 the fan is spinning at a higher speed. For the purpose of illustration, T_torque does not start on the estimated BEMF_ZC, but at a fixed time after t2x. In FIG. 7 and FIG. 8 the torque generating periods and the generator mode periods as well as the EHPs are indicated. Even though this is a possible embodiment of this invention, the extended time in generator mode only contributes to increased noise, and reduced efficiency. In both figures T_gen is about 40% of the EHP. The FG (10) signal reflects the BEMF_ZC position according to a hall signal, which is integrated for the purpose of demonstrate the position of the BEMF_ZC. This Hall sensor is not needed for the implementation of the invention. In FIG. 7 the BEMF_ZC_x falls between t3x and t2x, while in FIG. 8 the BEMF_ZC_x almost coincides with t3x. If t1x would be closer to BEMF_ZCx, it would also be possible that BEMF_ZCx falls between t1x and t3x. However, in such case the peak current at t3x (Ipeak(t3x) would be small, or even no negative generator mode current may be induced during T_gen.

In such case other algorithms may be used for detecting the BEMF_ZC, which are more suitable for low noise operation and optimal efficiency. An example of such an algorithm is disclosed in EP17179574.3.

The signal parameters for modifying the driving signal for an EHP may for example be selected from one or a combination of the following parameters: the shape of the driving signal, the power level of the driving signal, the driving period of the driving signal.

For example, the shape of the rising edge and/or of the falling edge of the driving signal may be adapted. The falling edge and/or the rising edge may for example have a soft slope or a hard switching shape.

Also the power level may be fixed at 30%, at 50%, up to 100%, or may vary for instance according to a soft start sequence, for instance increasing from 30% to 100% in a predefined increase in duty cycle per second, for instance 100% per second. Such soft start could also be adjusted based on the measured speed. For instance if the fan speed is less than 50% the duty cycle may be limited to 50% or 70%.

The driving signal may be based on a predefined power level, a predefined driving period, and a predefined shape. The predefined power level may for example be defined by the output duty cycle (it may for example be set at 50%). The invention is, however, not limited thereto. The driving signal of the first torque generating period may be defined using external components such as capacitors and/or resistors, using programmable memory such as E2PROM, or OTP or Flash memory, or be fixed in the state machine logic, or any other way possible to teach the fandriver prior to t0 about the appropriate driving period to make sure the driving period and strength is long enough to ensure the fan is accelerating, and not stopping, and on the other hand the driving signal is stopped before the BEMF_ZC is found. Typically, such timing depends on the fan mechanical inertia, and/or on the applied load, both external load applied to the motor blades, as the internal load due to the friction in the bearing. The signal parameters may also be derived by the controller from other information, such as the maximum achievable fan speed. An alternative method is to scan different start up timings sequentially until the fan starts up. Such sequential method may be easier to operate, as it does not need, or at least reduces the need for customization. On the other hand, the time needed to start up may not be acceptable for the application.

In embodiments of the present invention the driving period of the driving signal of the first EHP sequence may be determined based on the predefined driving period. This predefined driving period may be configurable in order to match with the inertia of the fan, or the load of the pump. The predefined period may be set when manufacturing the motor depending on the envisaged operating conditions. The predefined period should in that case be large enough to cover production tolerances, and wear over life time. Compared to hall sensor based solutions, control methods according to embodiments of the present invention include generator mode periods, in which the motor is not accelerating, but in which the motor is braking. Therefore, the startup time will be increased compared to hall sensor based startup and/or acceleration methods. Such delay may be compensated by increasing the applied current by 5% or 10% or more, at cost of increased noise. Methods according embodiments of the present invention may for example be used for starting low-cost state machine based fandrivers, or for microcontroller based fandrivers, using ROM memory, OTP memory or Flash memory.

Because in the example in FIG. 4(A) the motor receives only 20% of the energy compared to the example illustrated in FIG. 4(B), the BEMF_ZC moment t21 falls significantly later than in FIG. 4(B) than in FIG. 4(A).

As illustrated the current zero crossing can be used as an indicator of the BEMF change in polarity, in accordance with embodiments of the present invention. It is an advantage of embodiments of the present invention that this moment can be used for determining the next driving signal for driving the motor.

This compared to prior art methods which start up the single coil brushless DC motor which switch to a high impedance mode after T_torque. During this high impedance mode time window, the BEMF voltage can be directly monitored. It is an advantage of embodiments of the present invention, that they allows a seamless transition to high-performing methods, which do not require a high impedance mode time window, that induces torque ripple and limits output power, but using similar current sensing measurement circuits, which simplifies implementation.

It is an advantage of embodiments of the present invention that the very first BEMF_ZC can be approximated, which can then be used for determining the next driving signal for driving the motor. It is an advantage of embodiments of the present invention that thereby the chances for a successful startup of a single coil brushless DC motor can be increased.

In embodiments of the present invention the driving signal may be repeated until the motor starts rotating. It may for example be detected that the motor starts rotating by comparing the sensed currents with an ideal/real memorized current curve. The driving signal may be modified for each iteration. For example, the power level, and/or the driving period and/or the shape of the driving signal may be modified with each iteration. In embodiments of the present invention the driving signal may be modified such, that the motor is driven with increased energy after each iteration. This energy is also referred to as the startup energy. In order to open a sensing window, and because the inertia and friction may vary over production process, life time and ambient operating conditions, the window should be sufficient large to ensure to capture the current ZC point. Therefore, the driving signal should be defined by making the tradeoff between: applying sufficient torque to start up the fan, and applying a too long drive signal which may overlap the first BEMF voltage ZC.

Alternatively, during start up, the driving period T_torque of the driving signal may for example be varied progressively, for instance from 0.1 s to 0.2 s, to 0.3 s, . . . until 2 sec, with a predefined energization wave form, until the phase current goes in generator mode in a subsequent generator mode period. The time window in which the BEMF_ZC can be expected (the generator mode period) may also be defined during the initialization 100. An alternative decision criterium, that start up torque was sufficient, is to set a minimum Ipeak(t31) value, below which the startup procedure should be restarted with increased torque, by increasing either the time of T_torque, or increase the amplitude, or the shape, such that the overall torque is increased.

In embodiments of the present invention the driving signal may be modified using a combination of these parameters (shape, power level, driving period). Thereby the motor may be driven with increased energy. The power level of the driving signal may for instance increase progressively from 50% to 100% in 1 sec, and the driving period of the driving signal may be adjusted from 0.1 s to 0.2 sec to 2 sec.

In embodiments of the present invention the motor is driven such that a retrial period is present between subsequent driving signals. A retrial period is the period between the end of one driving signal and the beginning of the following driving signal. This driving signal and/or the retrial period Toff retrial and/or the ratio between the driving period and the retrial period, may be adjustable in function of other operational parameters, for instance as function of the chip junction temperature of the motor drive chip or they may be varied according to a predefined sequence.

In embodiments of the present invention, after monitoring 140 of the phase current, and defining the parameters of the next EHP sequence, a further driving signal may be applied including driving steps 120 and 130, and a new monitoring step 140, and determining step 110 may follow. Such a loop is illustrated in FIG. 6. Some signal parameters of the next EHP sequence (such as for example the driving signal of the next EHP sequence also referred to as the further driving signal) may be predefined 100. The further driving signal may be determined based on the previous zero crossing moments of the phase current and/or the zero crossing moment of the derivative of the phase current, possibly in combination with information of a previous driving signal. Possibly also predefined values such as the predefined power level, and/or the predefined driving period and/or the predefined shape may be used for defining the further driving signal. Previously obtained zero crossing moments of the phase current and/or estimated BEMF voltage zero crossing moments are indicative of the mechanical time constant and of the friction and of other loads of the motor. With every loop, this information can be further refined.

In embodiments of the present invention the method may comprise a step wherein another operational method of the brushless DC motor is triggered 150. This may for example result in a steady state operation of the brushless DC motor. Triggering the other operational method may for example be done when the motor has reached a minimum speed. Other triggering events may be defined based on the monitored parameters of the previous T_gen, or based on the parameters of multiple previous T_gens. For instance, if Ipeak(t3x) value drops below a certain threshold, or if in the defining step 110 it is analysed that the BEMF is shifting away from t2x closer to t3x. This triggering may comprise passing the necessary inputs for initializing the steady state operation. The other operational method may for example be based on predictive methods which adaptively control the driving signal.

Such an alternative operational method is for example described in EP17179574.3 wherein it is found by the inventors that if after T_torque the peak current is within certain thresholds, the time derivative of the phase current in the vicinity of the said peak current can be monitored to estimate the BEMF voltage ZC. Such predictive methods require initialization, which can be obtained through more robust methods such as described in this invention.

Other operational methods may also be based on BEMF voltage measurements during the application of high impedance windows after T_torque such as for example described in US20060214611.

In embodiments of the present invention two consecutive first zero crossing moments or two consecutive second zero crossing moments of the phase current are an indication of the rotation speed of the motor and may be used as a trigger moment for switching to another operational method of the motor. As the motor starts spinning, and timing information from previous commutations becomes available, there may be an interest to minimize the window to achieve optimal low noise operation, maximize efficiency and/or maximize output torque. In order to do so, the generating mode period must be reduced, this can be realized by switching to another operational method of the motor (e.g. using predictive BEMF_ZC, and adaptive control of the falling edge to ensure that the motor current has falling below a threshold at the time of the predicted BEMF_ZC). From the trigger moment, an adaptive algorithm may be loaded for controlling the steady state operation of the motor.

The trigger moment for triggering another operational method of the brushless DC motor may for example only be after the further driving signal after the first iteration or even after the second, or even third or even after the fourth iteration wherein an iteration comprises the steps of driving 120 to generate torque, driving 130 allowing the phase current to go in generator mode, monitoring 140, capturing 140, and determining 110 the parameters of the next EHP sequence (e.g. a start moment for the further driving signal).

In embodiments of the present invention the driving signal is applied to the motor such that the current flows in a certain direction through the coil. This direction determines the rotation direction of the rotor and may be determined before startup of the motor depending on the rotor position. This may be achieved by the initialization step 100.

If due to some disturbance the predicted BEMF_ZC is outside a preset margin, or the motor current falls outside a preset window of thresholds as defined by an adaptive algorithm, it may be interesting to give up on optimal noise/efficiency/torque control, and apply a control method in accordance with embodiments of the present invention. Disturbances may for example be caused by a varied load due to some blocking effect on the motor (e.g. on the fan blades, or on the fan bearing) or due to the removal of a blocking effect, or due to a rapidly varying supply. Since this will increase the falling edge, one of the possible outcomes may be that the motor current becomes negative. In such case a control method in accordance with embodiments of the present invention may be applied to get an indication of the BEMF_ZC, and after few steps with the obtained timing information, the control may change back to another operational method.

In this case there is an interest to refine the time location of the BEMF_ZC, by using timing information of t1x or t(dI/dt=0) which corresponds with t3x. It is found by the inventors that the BEMF voltage ZC will be located between t(dI/dt=0) and the second zero crossing moment of the phase current t2x. Depending on how severe negative the current the BEMF voltage ZC may be more located towards one or the other side. The first zero crossing moment t1x of the phase is just an easier means than dI/dt=0 to provide the same information, since dI/dt=0 always lays between t1x and t2x. A means to converge towards steady state operation of the motor is to reduce the time between t1x and t2x, by adjusting the time of the falling edge of the driving signal for subsequent iterations x. As soon as the time between t1x and t2x is smaller than a predefined generator period or as soon as the absolute value of the generator mode peak current is positive or smaller than a predefined current threshold, another operational method, such as disclosed in EP17179574.3, may be used for driving the motor. In embodiments of the present invention the predefined current threshold and/or the predefined generator period may be configurable.

FIG. 7 and FIG. 8 illustrate the applicability of a control method in accordance of embodiments of the present invention when the current changes direction.

This may for example be the case for a 2nd or 3rd drive signal during an open loop start up sequence, prior to switching to predictive mode, in order to ensure enough window. It may for instance be the case during convergence towards a state wherein the current does not change direction. It may also be the case after mechanical disturbance (timeout triggering, or other) causing sudden speed change in the motor, outside of the correction range of the regulation loop.

In such a situation, the phase current is quickly converted into torque. The current crosses zero, before BEMF voltage ZC is reached. In other words, the motor goes into generator mode, effectively braking the motor. The current is fully controlled by the BEMF, and will go again through zero at, (or slightly lagging depending on the electrical time constant of the motor) the BEMF voltage ZC moment. In the graph of FIG. 7 the driving signal has an output duty cycle DCout=20% resulting in a low phase current Iphase. In the graph of FIG. 8 the driving signal has an output duty cycle DCout=100% resulting in a high Iphase. FIGS. 7 and 8 also show how the ratio of Ipeak(t3x) versus the average current during the torque period (Iphase_torque), can be used as indication that the BEMF_ZC is closer to t3x or closer to t2x. In FIG. 7 the ratio of Ipeak(t3x)/Iphase_torque~1. In this case the BEMF_ZC is closer to t2x. The fact that t3x is proportionally shifted towards the middle of t2x and t1x, is an indication that BEMF_ZC will not coincide with t2x, but rather be in the middle between t2x and t3x. While in FIG. 8 the ratio of Ipeak(t3x)/Iphase_torque<<1. The BEMF_ZC is now best approximated by t3x. In FIG. 7 and FIG. 8 t_lag represents the lag of t2x versus the actual BEMF_ZC (represented by the FG signal).

It is an advantage of embodiments of the present invention that they are applicable in recovery mode, after disturbance, to converge back to a stable other operational method (e.g. a predictive method).

In embodiments of the present invention the BEMF voltage ZC may be estimated between the first phase current zero crossing and the second phase current zero crossing. It may even be estimated more accurately between the moment the time derivative of the phase current equals zero t(dI/dt=0) and the second phase zero current crossing (t2x).

When the current peak t3x is close to t1x the following condition may apply:

$$(t2x-t1x)*0\% < (t3x-t1x) < (t2x-t1x)*10\%$$

This is the typical the case for low currents, during acceleration. In that case the BEMF voltage zero crossing is between t2x and t3x, but closer to t2x.

When t3x is shifting more to the middle between t2x and t1x, the following condition may apply:

$$(t2x-t1x)*30\% < (t2x-t3x) < (t2x-t1x)*50\%$$

In that case the BEMF voltage zero crossing is between t2x and t3x, but closer to t3x. So as the current peak shifts from t1x to t2x, the BEMF voltage ZC is shifting from t2x towards the current peak.

In embodiments of the present invention the BEMF voltage ZC may be estimated between the first phase current zero crossing t1x and the second phase current zero crossing t2x. This may for example be possible if t1x is immediately after the start of T_genx, and, proportionally to the EHP, far from the second zero crossing moment of the phase current t2x. In that case t3x will be close to t1x, and t2x will be representative for the BEMF voltage ZC. As, during motor control, t1x is shifting towards t2x, the BEMF voltage zero crossing may be estimated by (t2x−t1x)/2. In embodiments of the present invention the generator mode peak current value Ipeak (t3x) may be compared with a driving current value indicative for the phase current while driving the motor. This may for example be the peak of the phase current or the RMS vale of the phase current when driving the motor using the driving signal. The driving current value indicative for the phase current may for instance also be based on the applied duty cycle, and/or on the RMS current, and/or on the phase current at a single time point anywhere within the torque generating period. The larger the ratio, the bigger the generator mode time. In that case t2x is most representative of the BEMF voltage ZC. As the ratio reduces, another operation mode may be started if, for example, the current does not change direction after the driving signal anymore.

In a second aspect embodiments of the present invention relate to a device 200 for controlling a single coil brushless DC motor. The device 200 comprises a driver 210 configured for driving the single coil brushless DC motor during at least a first EHP sequence using a driving signal during a torque generating period, to accelerate the motor, such that during a subsequent generator mode period a phase current goes in generator mode, and configured for driving 130 the motor during the generator mode period using a generator mode signal which allows the phase current to be in generator mode; a current sensor 220 configured for monitoring the phase current through the coil of the single coil brushless DC motor during the generator mode period thereby obtaining phase current information. In embodiments of the present invention the device 200 is configured for capturing time information comprising a first zero crossing moment of the phase current and/or a second zero crossing moment of the phase current, and/or a zero crossing moment of a time derivative of the phase current in between the first and the second zero crossing moment of the phase current. In embodiments of the present invention the device 200 is configured for determining the parameters of a next EHP sequence based on the phase current information. This may for example be based on the time information of previous EHPs. This may for example involve determining a start moment for driving the motor using a driving signal (also referred to as a further driving signal) in the next EHP sequence. The start moment may be determined directly after the second zero crossing moment, directly after the zero crossing moment of the time derivative of the phase current, or after the first zero crossing moment of the phase current or in between any combination of two of those.

Figure 9:
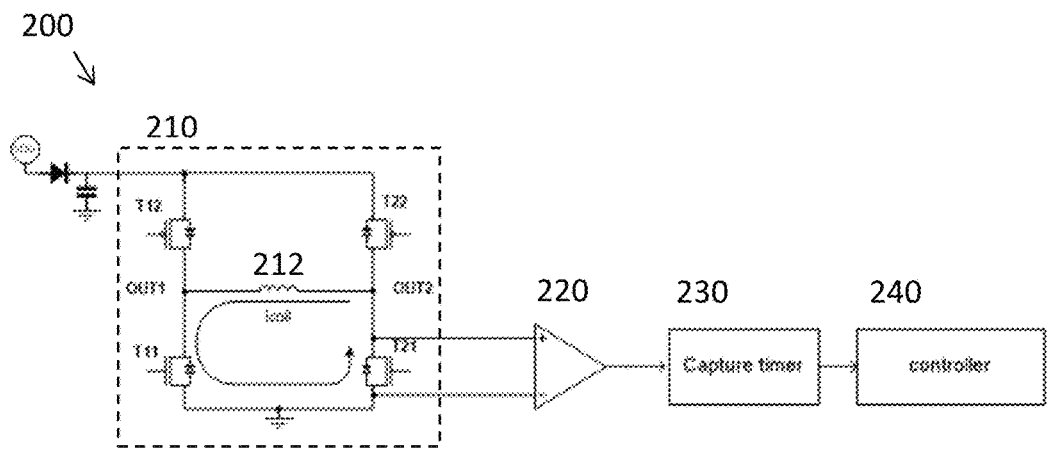
FIG. 9 shows a schematic drawing of a device 200 in accordance with embodiments of the present invention.

FIG. 9 shows a schematic drawing of a device 200 in accordance with embodiments of the present invention. It this example the driver 210 is a full bridge driver comprising transistors T11, T12, T22, T21. In the example, these are FETs (field effect transistors). The full bridge driver is configured such a current can be injected through the coil 212 which has coil terminals OUT1 and OUT2. Coil terminal OUT1 is connected between transistors T12 and T11 and coil terminal OUT2 is connected between transistors T22 and T21. The two high side transistors T12 and T22 are connected with the supply node VDD, and the two low side transistors T11 and T21 are connected with the ground.

In embodiments of the present invention the phase current is measured by the current sensor 220 which is in this exemplary embodiment of the present invention connected over transistor T21. In embodiments of the present invention the phase current is measured during an undriven period.

In FIG. 9 an example of 0% duty cycle is shown in which the current is freewheeling over the two low-side n-channel transistors (NFETs). For instance, T11 and T21 are switched ON. Alternatively, only T11 may be switched on. In that case the current will freewheel through the body diode of T21. Alternatively, the freewheeling can be done on the two high side transistors, which can be p-channel transistors (PFET) or NFET type.

The sequence duration, from the start of the driving signal until the zero crossing of the phase current, may be determined by digital means such as a timer or by analog means such as an RC oscillator. Such a timer is illustrated by the capture timer 230 in FIG. 9

In embodiments of the present invention the phase current may be monitored through any of the FETs through which it is flowing, or using a shunt which must be in the freewheeling path.

In embodiments of the present invention a controller 240 (also shown in FIG. 9) may be configured such that control of the driving signal (the driving signal and/or the further driving signal) is possible. This may allow to control the amount of startup energy. This may for example be achieved by pulse width modulation of the driving signal. In that case, a PWM input module may be configured to control the output duty cycle of the PWM driving signal. The driving period may for example be controlled using a resistor, or capacitor, or any other discrete component. The device may also comprise a PWM input port for controlling the duty cycle DCout of the driving signal. The device may also comprise an EEPROM for controlling the signal parameters of the driving signal.

The invention claimed is:

1. A method for controlling a single coil brushless DC motor, the method comprising at least a first electrical half period (EHP) sequence which comprises:
 driving the motor using a driving signal during a torque generating period, to accelerate the motor, such that during a subsequent generator mode period a phase current goes in generator mode,
 driving the motor during the generator mode period using a generator mode signal, which allows the phase current to be in generator mode,
 monitoring the phase current during the generator mode period thereby obtaining phase current information, and
 determining parameters of a next EHP sequence based on the obtained phase current information;
 wherein part of the obtained phase current information is timing information comprising a first zero crossing moment of the phase current and/or a second zero crossing moment of the phase current and/or a zero crossing moment of a time derivative of the phase current in between the first and the second zero crossing moment of the phase current; and
 wherein the determining step comprises determining a rising edge and/or a falling edge of a driving signal of the next EHP sequence based on the obtained phase current information and wherein the rising edge of the further driving signal is determined directly after the second zero crossing moment of the phase current, or directly after the first zero crossing moment of the phase current or directly after the zero crossing moment of the time derivative of the phase current or in between the first and the second zero crossing moment of the phase current or in between any combination of two of those.

2. A method according to claim 1 wherein the determining step comprises determining a rising edge and/or a falling edge of a driving signal of the next EHP sequence based on the obtained phase current information.

3. A method according to claim 2 wherein a start moment of the falling edge of the driving signal is determined such that the first and the second zero crossing moment of the phase current are closer together for the next EHP sequence than for a previous EHP sequence.

4. A method according to claim 1 wherein the monitoring step comprises obtaining a generator mode peak current value of the phase current during the generator mode period at the zero crossing moment of the time derivative of the phase current in between the first and the second zero crossing moment of the phase current, and
 wherein the determining step comprises determining parameters of a next EHP based on the obtained timing information and on the obtained generator mode peak current value.

5. A method according to claim 4 wherein the monitoring step comprises capturing current information while driving the motor during the torque generating period wherein a driving current value indicative for the phase current is captured,
 the start moment for driving the motor using the further driving signal is determined based on the ratio of the generator mode peak current value and the driving current value such that the start moment is closer to the first zero crossing moment of the phase current when the absolute value of the ratio is smaller.

6. A method according to claim 1, the method comprising iterations wherein the steps of driving the motor during the torque generating period, driving the motor during the generator mode period, monitoring the phase current, and determining parameters of a next EHP sequence are repeated, the next EHP sequence comprising a further driving signal wherein a further driving signal of an iteration corresponds with a driving signal of the next iteration.

7. A method according to claim 6, wherein the driving, monitoring, and determining steps are repeated until the time between the first zero crossing of the phase current and the second zero crossing of the phase current is smaller than a predefined generator period and/or as soon as the absolute value of the generator mode peak current is positive or smaller than a predefined current threshold.

8. A method according to claim 1 wherein parameters of at least one EHP sequence are determined based on predefined signal parameters.

9. A method according to claim 1 wherein the motor is driven from standstill and wherein driving the motor using the driving signal and monitoring the phase current are repeated until the motor starts rotating and wherein the driving signal is changed such that a power of the driving signal is increased over the iterations.

10. A method according to claim 1 wherein the parameters of the next EHP sequence are determined based on signal parameters of a previous driving signal and/or based on previously captured zero crossing moments in between which the phase current is in generator mode and/or of the time derivative of the phase current in generator mode.

11. A method according to claim 1, the method comprising triggering leaving the control method and starting another operational method of the brushless DC motor.

12. A device for starting up a single coil brushless DC motor, the device comprising:
 a driver configured for driving the single coil brushless DC motor using a driving signal during a torque generating period, to accelerate the motor, such that during a subsequent generator mode period a phase current goes in generator mode, and for driving the motor during the generator mode period using a generator mode signal, which allows the phase current to be in generator mode,
 a current sensor configured for monitoring the phase current during the generator mode period thereby obtaining phase current information,
 wherein the device is configured for determining parameters of a next electrical half period (EHP) sequence based on the obtained phase current information;
 wherein part of the obtained phase current information is timing information comprising a first zero crossing moment of the phase current and and/or a second zero crossing moment of the phase current and/or a zero crossing moment of a time derivative of the phase current in between the first and the second zero crossing moment of the phase current; and
 wherein determining the parameters comprises determining a rising edge and/or a falling edge of a driving signal of the next EHP sequence based on the obtained phase current information and wherein the rising edge of the further driving signal is determined directly after the second zero crossing moment of the phase current, or directly after the first zero crossing moment of the phase current or directly after the zero crossing moment of the time derivative of the phase current or in between the first and the second zero crossing moment of the phase current or in between any combination of two of those.

* * * * *